United States Patent
Chou et al.

(10) Patent No.: US 11,504,763 B2
(45) Date of Patent: Nov. 22, 2022

(54) ALUMINUM ALLOY WHEEL AND METHOD FOR MANUFACTURING THE SAME

(71) Applicant: Industrial Technology Research Institute, Hsinchu (TW)

(72) Inventors: Yu-Hsien Chou, Tainan (TW); Chi-San Chen, Kaohsiung (TW); Chih-Chao Yang, Tainan (TW); Chang-Ching Chen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 20 days.

(21) Appl. No.: 17/135,997

(22) Filed: Dec. 29, 2020

(65) Prior Publication Data

US 2022/0161313 A1    May 26, 2022

(30) Foreign Application Priority Data

Nov. 26, 2020  (TW) .................................. 109141593

(51) Int. Cl.

| | |
|---|---|
| *B22D 13/04* | (2006.01) |
| *B21J 5/00* | (2006.01) |
| *B22D 13/10* | (2006.01) |
| *B22D 21/04* | (2006.01) |
| *B60B 9/00* | (2006.01) |
| *C22F 1/047* | (2006.01) |
| *C22C 21/06* | (2006.01) |
| *B21K 1/40* | (2006.01) |
| *B21K 1/38* | (2006.01) |
| *B60B 3/06* | (2006.01) |

(52) U.S. Cl.
CPC .............. *B21J 5/002* (2013.01); *B22D 13/04* (2013.01); *B22D 13/101* (2013.01); *B22D 21/04* (2013.01); *B60B 9/00* (2013.01); *C22C 21/06* (2013.01); *C22F 1/047* (2013.01); *B21K 1/38* (2013.01); *B21K 1/40* (2013.01); *B60B 3/06* (2013.01); *B60B 2360/104* (2013.01)

(58) Field of Classification Search
None
See application file for complete search history.

(56) References Cited

U.S. PATENT DOCUMENTS

| 5,065,809 A | 11/1991 | Sato et al. |
| 5,671,533 A | 9/1997 | Dillamore et al. |

(Continued)

FOREIGN PATENT DOCUMENTS

| CN | 1035560 | 8/1997 |
| CN | 105937003 | 9/2016 |

(Continued)

OTHER PUBLICATIONS

"Office Action of Taiwan Counterpart Application", dated Aug. 17, 2021, p. 1-p. 8.

*Primary Examiner* — Daniel J. Schleis
(74) *Attorney, Agent, or Firm* — JCIPRNET

(57) ABSTRACT

An aluminum alloy wheel for a vehicle is provided, which includes: a wheel central portion, a rim portion, and a plurality of radial elements, wherein the aluminum alloy wheel is processed by centrifugal casting and forging to form a central portion with a morphology exhibiting a grain size variation with decreasing gradient in a lateral direction from an inner side of the wheel central portion to an outer side thereof.

3 Claims, 8 Drawing Sheets

(56) References Cited

U.S. PATENT DOCUMENTS

| | | | |
|---|---|---|---|
| 8,141,615 B1 | 3/2012 | Ferrando et al. | |
| 2016/0376689 A1 | 12/2016 | Schloffer et al. | |
| 2019/0217376 A1* | 7/2019 | Nanninga | ............... B60B 3/002 |

FOREIGN PATENT DOCUMENTS

| | | |
|---|---|---|
| CN | 106238633 | 12/2016 |
| CN | 107164659 | 9/2017 |
| CN | 110695278 | 1/2020 |
| CN | 111114197 | 5/2020 |
| CN | 111687395 | 9/2020 |
| CN | 111770840 | 10/2020 |
| JP | 2001252754 | 9/2001 |
| TW | 534843 | 6/2003 |
| TW | I224985 | 12/2004 |
| TW | 201143930 | 12/2011 |
| TW | 201521898 | 6/2015 |
| TW | I491456 | 7/2015 |
| WO | 2010026780 | 3/2010 |
| WO | 2011096178 | 8/2011 |

* cited by examiner

ALUMINUM ALLOY WHEEL AND METHOD FOR MANUFACTURING THE SAME

CROSS-REFERENCE TO RELATED APPLICATION

This application claims the priority benefit of Taiwan application serial no. 109141593, filed on Nov. 26, 2020. The entirety of the above-mentioned patent application is hereby incorporated by reference herein and made a part of this specification.

TECHNICAL FIELD

The disclosure relates to a 6XXX series aluminum alloy wheel and a casting and forging combination process method thereof.

BACKGROUND

6XXX series aluminum alloys are difficult to process due to poor flow characteristics. The aluminum alloys need to be slowly drawn into a billet via a continuous casting method, and then cut into ingots with sizes close to the desired final product requirements. In the manufacture of a traditional 6XXX series aluminum alloy wheel for a vehicle, from aluminum alloy ingot forging to semi-finished aluminum alloy wheel, a three-pass forging sequence are needed, including: pre-forging, rough-forging, and fine-forging, to gradually form a wheel blank. Each of the above forging processes demands the use of different forging machines and molds design, thus significantly increasing equipment investment costs. Since the 6XXX series aluminum alloy wheel is manufactured by directly forging a solid cast blank into a hollow-shaped wheel blank, the waste of the aluminum alloy material can be as high as 70%; and the recovered material needs to be sent back to continuous casting plant for re-smelting and then returned to the forging plant for further processing. In addition to being time-consuming, energy consumption is also increased, thus significantly boosting the overall production costs.

Although the 6XXX series aluminum alloy forged wheel is of excellent quality, the cost for manufacturing thereof is high, and is generally used in luxury cars or sports cars. Another type of aluminum alloy wheel cast with AXXX series aluminum alloy has lower mechanical performance, but is cheaper, and is generally used in economy cars. Therefore, the current aluminum alloy wheel manufacturing technique may not meet the requirements for a diversified wheel market.

SUMMARY

An embodiment of the disclosure discloses an aluminum alloy wheel for a vehicle, the structure of which includes: a wheel central portion; a rim portion surrounding the wheel central portion; and a plurality of radial elements connected to the wheel central portion and the rim portion, wherein the central portion exhibits a grain size variation with decreasing gradient in a lateral direction from an inner side of the wheel central portion to an outer side thereof.

Another embodiment of the disclosure discloses a method for manufacturing an aluminum alloy wheel for a vehicle including the following steps: providing a 6XXX series aluminum alloy molten stock; pouring the aluminum alloy molten stock into a mold cavity having a wheel shape to form a wheel-shaped casting blank using a centrifugal casting; performing a homogenizing treatment on the casting blank; and performing a fine-forging and a post-processing on the casting blank in sequence to obtain the aluminum alloy wheel.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
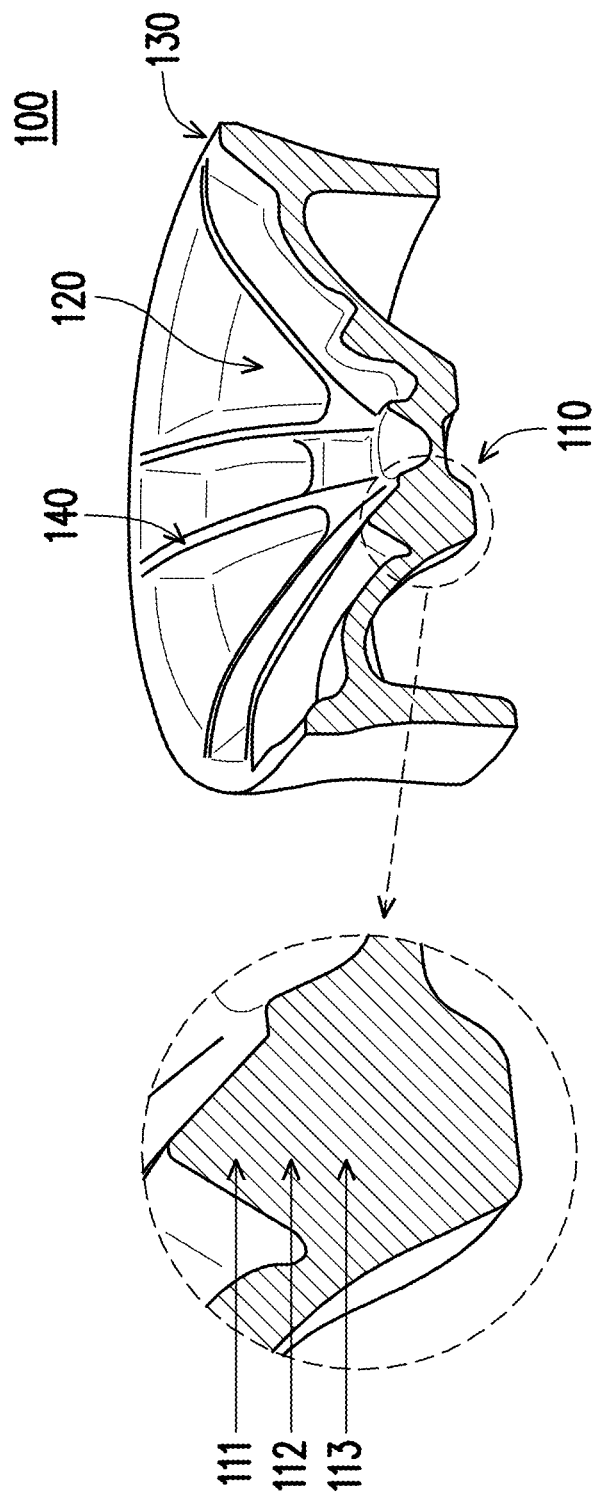
FIG. 1 is a three-dimensional cross-sectional view of a semi-finished product of a 6XXX series aluminum alloy wheel according to an embodiment of the disclosure.

FIG. 1 is a three-dimensional cross-sectional view of a semi-finished product of a 6XXX series aluminum alloy wheel for a vehicle according to an embodiment of the disclosure. Please refer to FIG. 1, a semi-finished aluminum alloy wheel 100 of the disclosure mainly includes a wheel central portion 110, a disc portion 120, a rim portion 130, and a plurality of radial elements 140. The central portion exhibits a grain size variation with decreasing gradient in a lateral direction from an inner side of the wheel central portion to an outer side thereof.

Although FIG. 1 is a semi-finished product used for an aluminum alloy wheel for the vehicle disclosed in the disclosure, it should be realized that after subsequent processing (such as turning and milling, T6 heat treatment, painting), the resulting aluminum alloy wheel for the vehicle is composed of the wheel central portion 110, the rim portion 130, and the radial elements 140 obtained by precise design. Since there is no high-temperature treatment in the aforementioned subsequent processing, the material properties of the aluminum alloy are not affected, such as the lateral grain size and changes thereof. Therefore, the changes in the lateral grain size of the wheel central portion 110 of the semi-finished aluminum alloy wheel 100 are preserved, and also appear in the finished product.

In some embodiments, a 6XXX series aluminum alloy is used for the aluminum alloy wheel for the vehicle. In addition, as shown in FIG. 1, the surface of the semi-finished aluminum alloy wheel 100 is set as a first region 111, the core of the semi-finished aluminum alloy wheel 100 is set as a third region 113, and the region between the first region 111 and the third region 113 is set as a second region 112. Therefore, the grain size variation of the first region 111 is, for example, 5% to 20%, the grain size variation of the second region 112 is, for example, 25% to 45%, and the grain size variation of the third region 113 is, for example, 46% to 60%. The "grain size variation" is a percentage value obtained based on the "average grain size of a single region (the first region 111, the second region 112, or the third region 113)" as the denominator and "the deviation between the maximum (or minimum) grain size of a single region and the average grain size of the region" as the numerator. In an embodiment, the grain size variation of the first region 111 of the wheel central portion 110 of the semi-finished aluminum alloy wheel 100 is 10%; the grain size variation of the second region 112 is 40%; and the grain size variation of the third region 113 is 50%. In other words, the grain size distribution range at the surface (the first region 111) of the semi-finished aluminum alloy wheel 100 is the smallest, and the grain size distribution range at the core (the third region 113) of the semi-finished aluminum alloy wheel 100 is the largest.

In some embodiments, the grain size of the first region 111 of the wheel central portion 110 of the semi-finished aluminum alloy wheel 100 ranges from 90 microns to 110 microns; the grain size of the second region 112 ranges from 100 μm to 230 μm; and the grain size of the third region 113 ranges from 100 μm to 300 μm.

Figure 2A:
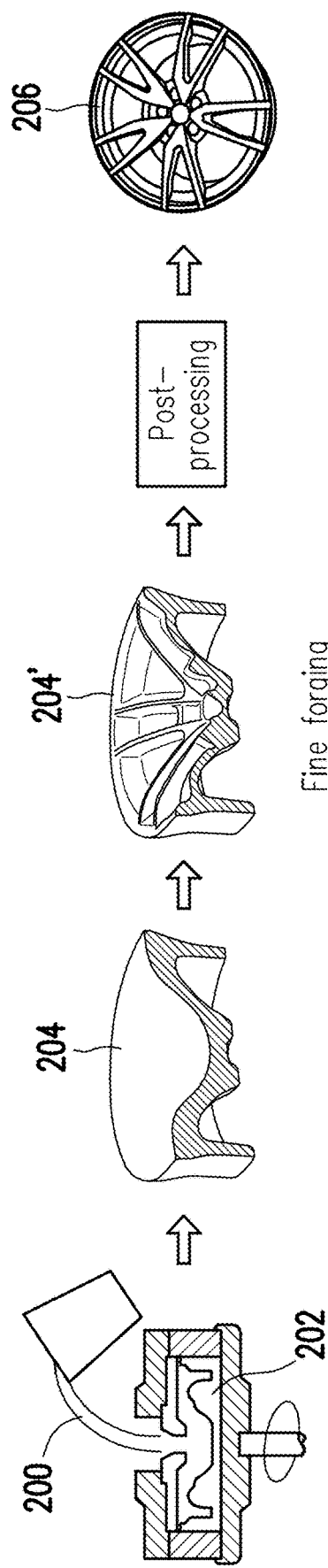
FIG. 2A is a diagram of the manufacturing steps of an aluminum alloy wheel for a vehicle according to another embodiment of the disclosure.

FIG. 2A is a diagram of the manufacturing steps of an aluminum alloy wheel for a vehicle according to another embodiment of the disclosure.

Figure 2B:
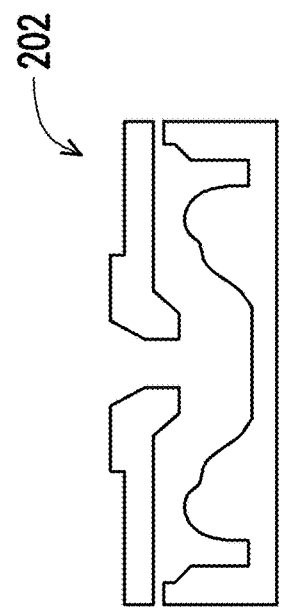
FIG. 2B is a cross-sectional view of the mold structure of FIG. 2A.

Referring first to FIG. 2A, the manufacturing steps of the aluminum alloy wheel of the present embodiment include: first, providing a 6XXX aluminum alloy molten stock 200, and the preparation method thereof is, for example, placing an ingot or a block material in a melting furnace to melt to form a molten stock, and then pouring the aluminum alloy molten stock 200 into a mold 202 having a wheel-shaped cavity (please refer to the diagram of the mold structure of FIG. 2B), and then the mold 202 is rotated using a centrifugal casting machine (not shown) to form a wheel-shaped casting blank 204. Then, a homogenizing treatment is performed on the wheel-shaped casting blank 204; and fine-forging is sequentially carried out to obtain a finer semi-finished aluminum alloy wheel 204', and subsequent post-processing is conducted to form an aluminum alloy wheel 206.

In some embodiments, before the wheel-shaped casting blank 204 is fine-forged, the wheel-shaped casting blank 204 may also be rough forged first.

In some embodiments, the 6XXX series aluminum alloy after centrifugal casting may be directly formed in a 'near-net-shape' into the wheel-shaped casting blank 204 with appropriate mechanical strength. The yield strength of the aluminum alloy wheel 206 is, for example, greater than 130 MPa and the compression ratio thereof is, for example, greater than 80%. The mechanical properties of the wheel-shaped casting blank 204 formed by the centrifugal casting disclosed in the above embodiment have reached the mechanical property requirements of a forged blank of the 6XXX series aluminum alloy wheel blank manufactured by a traditional continuous casting method. Therefore, the embodiments of the disclosure may replace the initial forging process of the traditional aluminum alloy wheel forging, and the pre-forging step or even the rough-forging step maybe omitted, to directly form the aluminum alloy wheel 206 via fine-forging with a post-processing treatment.

In some embodiments, the manufacture of the aluminum alloy wheel for the vehicle only needs 8 processing steps or less, including: aluminum alloy smelting (including degassing and slag removal), centrifugal casting, homogenization, rough-forging, fine-forging, turning and milling, T6 heat treatment, and painting. In contrast, the traditional continuous casting blank forging method to manufacture the 6XXX series aluminum alloy needs up to 10 processing steps, including: aluminum alloy smelting (including degassing and slag removal), continuous casting, ingot cutting, homogenization, pre-forging, rough-forging, fine-forging, turning and milling, T6 heat treatment, and painting.

In some embodiments, the wheel-shaped casting blank 204 formed by centrifugal casting already has a wheel shape, so that a pre-forging step with large deformation may be omitted, and only rough-forging and fine-forging are needed to obtain a finer semi-finished aluminum alloy wheel 204'. In comparison, in the manufacture of a traditional 6XXX series aluminum alloy wheel, in each step of the three-pass forging sequence (pre-forging, rough-forging, and fine-forging), the 6XXX series aluminum alloy wheel blank is subjected to closed-die forging. While the pre-forging process has the largest forming pressure resulting in massive grain deformation, the rough-forging and fine-forging only create minor modification in the wheel structure, for refinement and aesthetic purposes. Therefore, the grain size distribution of the traditional 6XXX series aluminum alloy forged aluminum wheel is more uniform and finer, which is mainly attributed to the contribution of substantial grain deformation underwent during the first pre-forging process. In the aluminum alloy wheel 206 of the disclosure, the wheel-shaped casting blank 204 is formed by centrifugal casting, followed by placing the wheel-shaped casting blank 204 in a closed-die for rough-forging and fine-forging in sequence, to refine the wheel structure. The forming pressures of rough-forging and fine-forging are smaller than that of pre-forging. As a result, the forming pressure of the wheel central portion 110 of the aluminum alloy wheel 206 varies from an inner side (the third region 113) to an outer side (the first region 111). The internal grain endures smaller deformation, while that of the external experiences larger deformation, so that the grain size in the outer side of the central portion 110 is smaller than that of the inner side thereof. As a result, the microstructure of the wheel central portion 110 of the aluminum alloy wheel 206 shows a gradient change with finer outer grains and coarser inner grains.

In some embodiments, after centrifugal casting, the wheel-shaped casting blank 204 of the 6XXX series aluminum alloy may be formed in a 'near-net-shape' directly into a wheel-shaped casting blank having appropriate mechanical strength, and then formed into an aluminum alloy wheel via rough-forging and fine-forging in sequence. Therefore, the average material yield from the aluminum alloy wheel blank to the aluminum alloy wheel 206 is, for example, greater than 40%, thus reducing the loss of the aluminum alloy material.

In some embodiments, the 6XXX aluminum alloy molten stock 200 is poured into the mold 202 having a wheel-shaped cavity at a casting temperature of, for example, 680° C. to 800° C.

In some embodiments, centrifugal casting is performed at a rotation speed of, for example, 1200 rpm to 2500 rpm to form the 6XXX aluminum alloy wheel-shaped casting blank 204.

In some embodiments, the homogenizing treatment temperature of the 6XXX aluminum alloy wheel-shaped casting blank 204 is, for example, 550° C. to 590° C., and the treatment time is, for example, 5 hours to 9 hours.

Below, several experiments are provided to verify the efficacy of the embodiments of the disclosure, but the scope of the disclosure is not limited to the following.

Experimental Example 1

A 6061 series aluminum alloy (cast ingot or block) was placed into a melting furnace to melt to form an aluminum alloy molten stock. Then, the aluminum alloy molten stock was kept at a temperature of 750° C., and poured into a mold having a wheel-shaped cavity for centrifugal casting. Then, the aluminum alloy was rotated and solidified to form a wheel-shaped casting blank; in the experiment, the rotation speed was changed for different centrifugal castings. After centrifugal casting, the casting blank was homogenized and heat-treated at a temperature of 570° C. for 7 hours. The metallographic structure thereof was observed using an optical microscope, and the relative density and the mechanical properties thereof were measured. The relative density of the present Experimental example was obtained by measuring the outer volume of each sample by an Archimedean method, and then calculating the relative density of the sample.

Figure 3:
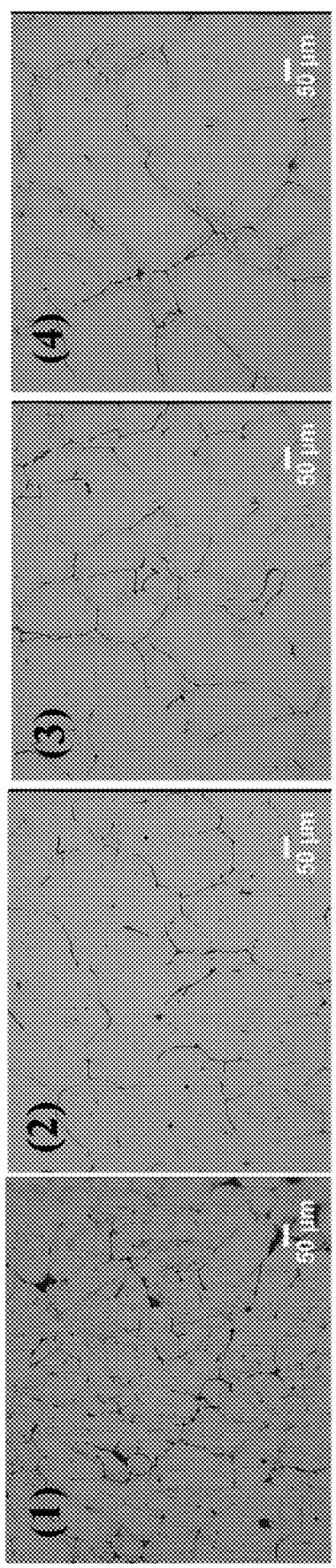
FIG. 3 is a diagram of a metallographic microstructure corresponding to the method for manufacturing the 6XXX series aluminum alloy wheel according to Experimental example 1 of the disclosure.

The centrifugal casting rotation speeds and the corresponding metallographic structures, relative densities, and mechanical properties thereof are sorted in FIG. 3 and Table 1.

TABLE 1

| Number | Rotation speed (rpm) | UTS (MPa) | YS (MPa) | El. (%) | Relative density (%) |
|---|---|---|---|---|---|
| 1 | 1000 | 125.4 | 99.9 | 7.6 | 97.8 |
| 2 | 1200 | 176.8 | 131.3 | 9.5 | 98.6 |
| 3 | 1500 | 233.1 | 186.8 | 16.5 | 99.7 |
| 4 | 2000 | 231.8 | 170.4 | 15.9 | 99.6 |

Referring to FIG. 3, when the rotation speed of the centrifugal casting of the disclosure was too low, the hydrogen gas in the aluminum alloy molten stock could not be thrown off to the surface of the wheel blank by centrifugal force, causing the hydrogen to be trapped in the wheel blank, thus affecting the mechanical properties and the relative density. The detailed results are shown in Table 1. As the rotation speed was increased to 1500 rpm or more, the pore defects in the wheel blank could be significantly lessened, the relative density could reach 99.5% or more, the tensile strength was greater than 230 MPa, the yield strength was greater than 170 MPa, and the elongation was greater than 15%.

Experimental Example 2

A 6061 series aluminum alloy (cast ingot or block) was placed into a melting furnace to melt to form an aluminum alloy molten stock. Then, the aluminum alloy molten stock was poured into a mold having a wheel-shaped cavity for centrifugal casting. Then, the aluminum alloy was rotated and solidified at a fixed rotation speed of 1500 rpm to form a wheel-shaped casting blank; in the experiment, the casting temperature of the aluminum alloy molten stock was changed. Then, after the centrifugal casting, the casting blank was homogenized and heat-treated at a temperature of 570° C. for 7 hours to observe the metallographic structure, relative density, and mechanical properties thereof.

Figure 4:
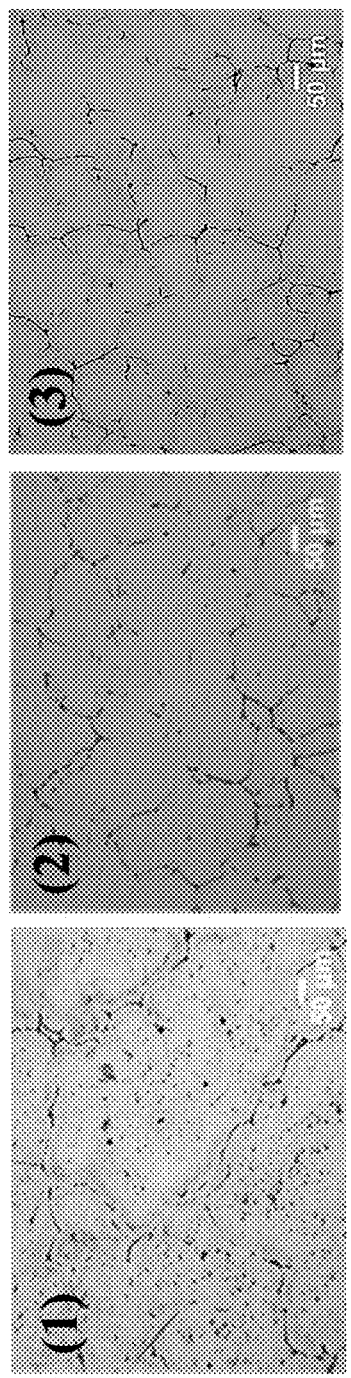
FIG. 4 is a diagram of a metallographic microstructure corresponding to the method for manufacturing the 6XXX series aluminum alloy wheel according to Experimental example 2 of the disclosure.

The casting temperatures of centrifugal casting and the corresponding metallographic structures, densities, and mechanical properties thereof are sorted in FIG. 4 and Table 2.

TABLE 2

| Number | Casting temperature (° C.) | UTS (MPa) | YS (MPa) | El. (%) | Relative density (%) |
|---|---|---|---|---|---|
| 1 | 680 | 205.1 | 135.1 | 10.6 | 98.9 |
| 2 | 730 | 236.8 | 176.4 | 16.9 | 99.8 |
| 3 | 780 | 228.4 | 163.8 | 14.3 | 99.3 |

FIG. 4 shows that when the casting temperature of the centrifugal casting of the disclosure was too low, the aluminum alloy melt solidification was too fast, and hydrogen gas was trapped in the wheel blank. Raising the casting temperature to 730° C. significantly lessened the pore defects in the wheel blank, with a relative density reaching 99.8%, a tensile strength greater than 230 MPa, a yield strength greater than 170 MPa, and an elongation greater than 16%, as shown in Table 2.

Experimental Example 3

From Experimental example 1 and Experimental example 2, a 6061 series aluminum alloy centrifugal casting wheel blank with a relative density of 99.5% or more was selected for compression testing. In the experiment, a Gleeble3500 thermal processing simulation system was used to perform high-temperature compression testing on the wheel blank obtained by centrifugal casting. Table 3 shows in detail that when the relative density of the wheel blank obtained by centrifugal casting reached 99.5%, the measured compression rate could reach 80%, without damaging the test piece. The above data verified that the aluminum alloy wheel blank obtained by centrifugal casting was forgeable, and had the advantages of the omission of the pre-forging step and that the aluminum alloy wheel could be directly formed by rough-forging and fine-forging.

TABLE 3

| Number | Rotation speed (rpm) | Casting temperature (° C.) | Relative density (%) | Compression ratio (%) |
|---|---|---|---|---|
| 1 | 1500 | 730 | 99.8 | 80 |
| 2 | 1500 | 750 | 99.7 | 80 |
| 3 | 2000 | 750 | 99.6 | 80 |

Experimental Example 4

Centrifugal casting was performed on a 6061 aluminum alloy to form a wheel-shaped casting blank. After homogenization and heat treatment at 570° C. for 7 hours, rough-forging and fine-forging were performed in sequence to form a semi-finished aluminum alloy wheel, as shown in FIG. 1.

Figure 5:
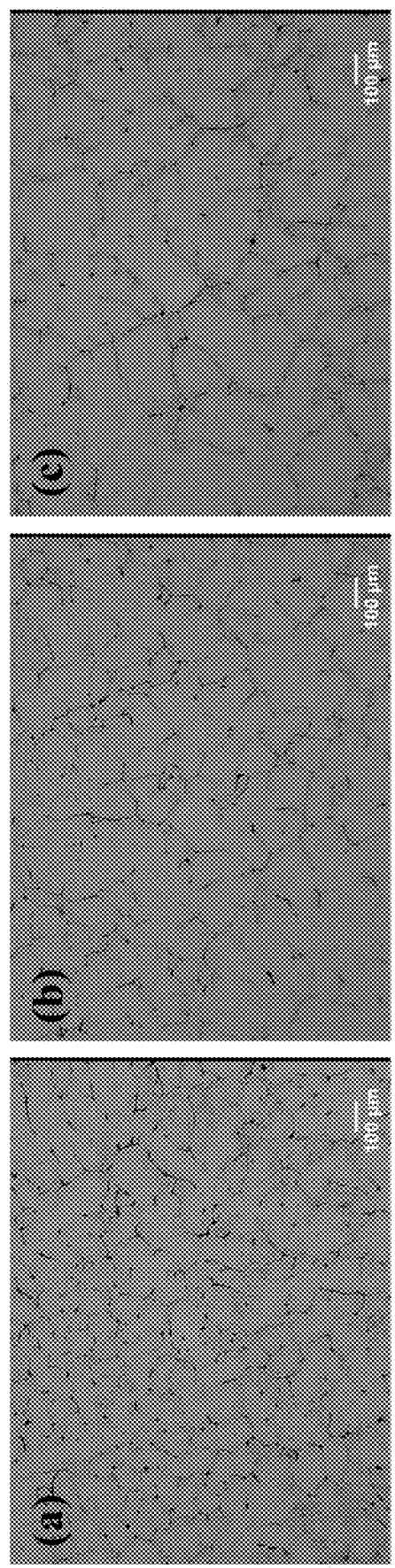
FIG. 5 is a diagram of a metallographic microstructure corresponding to the method for manufacturing the 6XXX series aluminum alloy wheel according to Experimental example 4 of the disclosure.

To compare with a traditional aluminum alloy wheel forging process, the centrifugal casting disclosed in the disclosure may replace the preliminary forged blank process of an aluminum alloy wheel. Therefore, the processing deformation of the semi-finished aluminum alloy wheel is lower, so that the central portion of this aluminum alloy wheel exhibits a grain size variation with decreasing gradient in a lateral direction from an inner side of the wheel central portion to an outer side thereof. FIG. 5 shows the changes in the microstructure of the semi-finished aluminum alloy wheel in different regions of the wheel central portion in the lateral direction observed using an optical microscope. Corresponding to the semi-finished aluminum alloy wheel shown in FIG. 1, the grain size of the first region 111 (FIG. 5(a)) located near the surface of the wheel central portion 110 had a minimum of 90 microns, a maximum of 110 microns, and an average grain size of 100 microns. Therefore, according to the calculation method shown in Table 4, the grain size variation of the first region 111 was 10%. The grain size of the second region 111 (FIG. 5(b)) located at the center of the wheel central portion 110 had a minimum of 100 microns, a maximum of 230 microns, and an average grain size of 165 microns. Therefore, according to the calculation method shown in Table 4, the grain size variation of the second region 112 was 40%. The grain size of the third region 113 (FIG. 5(c)) located near the core of the wheel central portion 110 had a minimum of 100 microns, a maximum of 300 microns, and an average grain size of 200 microns. Therefore, according to the calculation method shown in Table 4, the grain size variation of the third region 113 was 50%.

TABLE 4

| Region | Grain size (μm) | Average grain size (A) (μm) | Deviation in grain size (B) (μm) | Grain size variation (B/A * 100) (%) |
|---|---|---|---|---|
| 111 | 90 to 110 | 100 | ±10 | 10% |
| 112 | 100 to 230 | 165 | ±65 | 40% |
| 113 | 100 to 300 | 200 | ±100 | 50% |

Experimental Example 5

A 6061 aluminum alloy was subjected to centrifugal casting to form a wheel-shaped casting blank, and then rough-forge and fine-forge were sequentially performed to form the wheel shape. Since the casting blank completed by 'near-net-shape' centrifugal casting had a wheel shape, very little material was wasted. The average material yield of the present experimental example was 48.2%, as shown in Table 5.

TABLE 5

| Blanking weight (kg) | Finished product weight (kg) | Material yield (%) |
|---|---|---|
| 27.5 | 13.3 | 48.3% |
| 26.9 | 12.9 | 47.9% |
| 27.3 | 13.2 | 48.3% |
| Average material yield | | 48.2% |

Comparative Example 1

A 6061 series aluminum alloy (cast ingot or block) was placed into a melting furnace to melt to form an aluminum alloy molten stock. Then, the aluminum alloy molten stock was held at a temperature of 750° C., and poured into a mold having a wheel-shaped cavity for centrifugal casting, and then the aluminum alloy was spin-solidified to form a wheel-shaped casting blank. In the experiment, the rotation speed was changed for different centrifugal castings. After the centrifugal casting, the casting blank was homogenized and heat-treated at a temperature of 570° C. for 7 hours to observe the metallographic structure, relative density, and mechanical properties thereof.

Figure 6:
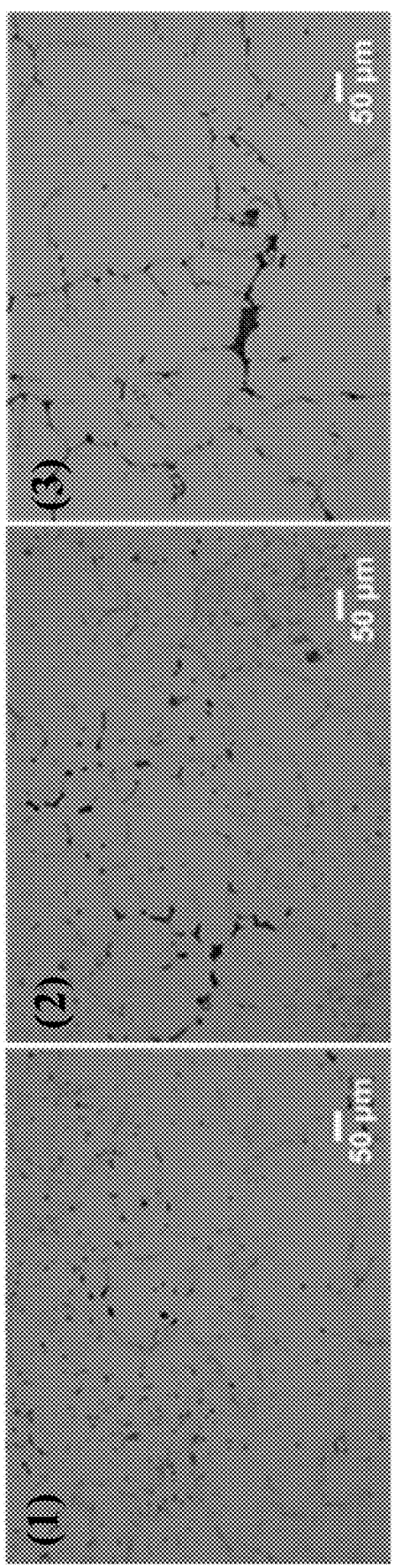
FIG. 6 is a diagram of a metallographic microstructure corresponding to the method for manufacturing the 6XXX series aluminum alloy wheel according to Comparative example 1 of the disclosure.

The centrifugal casting rotation speeds and the corresponding metallographic structures, relative densities, and mechanical properties thereof are sorted in FIG. 6 and Table 6.

TABLE 6

| Number | Rotation speed (rpm) | UTS (MPa) | YS (MPa) | El. (%) | Relative density (%) |
|---|---|---|---|---|---|
| 1 | 2500 | 121.2 | 96.6 | 5.8 | 95.2 |
| 2 | 3000 | 113.1 | 93.7 | 4.3 | 92.3 |
| 3 | 3500 | 109.7 | 92.2 | 3.6 | 91.7 |

FIG. 6 shows that when the rotation speed of the centrifugal casting disclosed in the disclosure was too fast, due to the poor fluidity of the 6061 series aluminum alloy molten stock, the temperature of the molten stock dropped too fast, causing the molten stock to solidify rapidly, resulting in poor filling performance, and large pores were easily retained in the wheel blank, thus affecting mechanical performance and relative density. Table 6 shows that as the rotation speed reached 3500 rpm, the pores expanded, thus reducing the relative density of the aluminum alloy and degrading the mechanical performance.

Comparative Example 2

A 6061 aluminum alloy ingot (casting temperature: 687° C. to 693° C., casting pressure: 8,500 pounds/hr, casting rate: 1.2 m/min to 1.3 m/min) obtained from a traditional continuous casting process was subjected to homogenization and heat treatment at 570° C. for 7 hours, and the metallographic structure, relative density, and mechanical properties thereof were measured.

Figure 7:
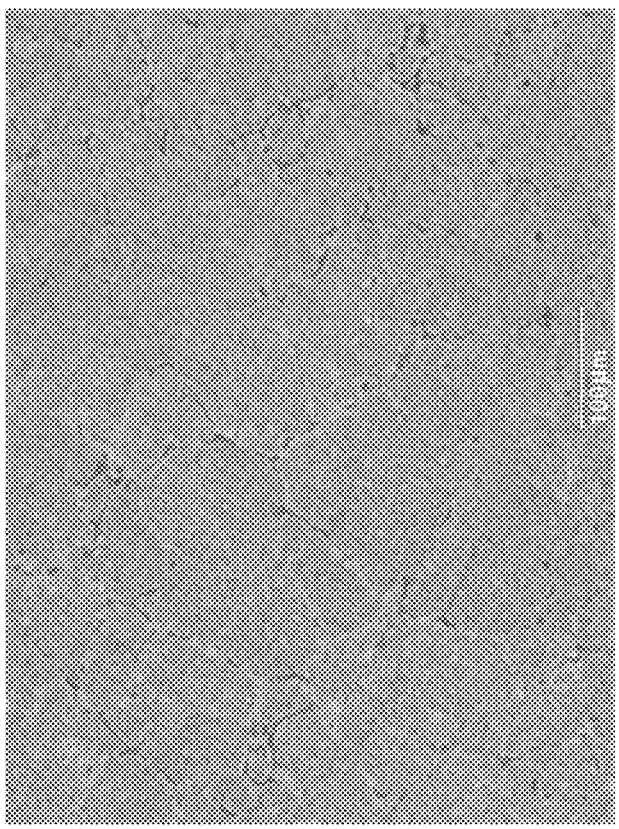
FIG. 7 is a diagram of a metallographic microstructure corresponding to the method for manufacturing the 6XXX series aluminum alloy wheel according to Comparative example 2 of the disclosure.

The continuous casting process and the corresponding metallographic structures, densities, and mechanical properties are summarized in FIG. 7 and Table 7.

TABLE 7

|   | UTS (MPa) | YS (MPa) | El. (%) |
|---|---|---|---|
| 1 | 147.3 | 70.2 | 15.6 |
| 2 | 148.2 | 68.5 | 17.4 |
| 3 | 144.6 | 72.2 | 16.9 |
| Average | 146.7 | 70.3 | 16.6 |

To compared with the centrifugal casting disclosed by the disclosure, the 6061 aluminum alloy wheel blanks obtained by the traditional continuous casting process all had low mechanical properties, wherein the tensile strengths were all less than 150 MPa, and the average yield strength was 70 MPa, with the exception that the elongation was greater than 15% and the compression ratio was 99.1%.

Therefore, the aluminum alloy wheel blanks formed by continuous casting had to further undergo a three forging sequence (fine-forging+rough-forging+fine-forging) after homogenizing treatment in order to meet the mechanical property requirements for a semi-finished aluminum alloy wheel.

Comparative Example 3

Figure 8:
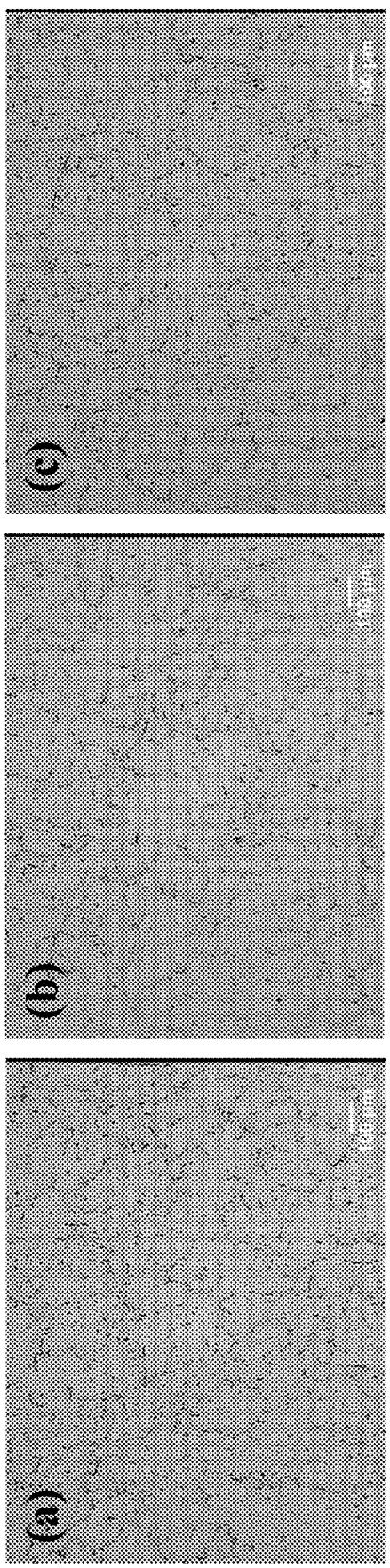
FIG. 8 is a diagram of a metallographic microstructure corresponding to the method for manufacturing the 6XXX series aluminum alloy wheel according to Comparative example 3 of the disclosure.

After a wheel blank was formed by the continuous casting of a 6061 aluminum alloy via a traditional aluminum ring forging process (casting temperature: 687° C. to 693° C., casting pressure: 8,500 pounds/hr, casting rate: 1.2 m/min to 1.3 m/min) and after homogenization and heat treatment at 570° C. for 7 hours, pre-forging, rough-forging, and fine-forging were performed in sequence to obtain a semi-finished aluminum alloy wheel. Next, the microstructure changes of the aluminum wheel were observed using an optical microscope, as shown in FIG. 8.

In the traditional aluminum alloy wheel forging process, the deformation of the aluminum is higher because each of the three-pass forging is carried out in a closed-die. Corresponding to the semi-finished aluminum alloy wheel 100 shown in FIG. 1, the first region 111, the second region 112, and the third region 113 of the wheel central portion 110 all showed fine and uniform grains from the outer side of the central portion of the aluminum alloy wheel to the inner side thereof, and the grain sizes were all about 80 microns to 100 microns. Comparative example 3 showed that the grain sizes at the wheel central portion were all the same in different lateral regions.

According to the calculation method disclosed in Table 8, the grain size variations of the first region 111, the second region 112, and the third region 113 were all the same at 11.11%.

TABLE 8

| Region | Grain size (μm) | Average grain size (A) (μm) | Deviation in grain size (B) (μm) | Grain size variation (B/A * 100) (%) |
|---|---|---|---|---|
| 111 | 80 to 100 | 90 | ±10 | 11.11% |
| 112 | 80 to 100 | 90 | ±10 | 11.11% |
| 113 | 80 to 100 | 90 | ±10 | 11.11% |

Comparative Example 4

In the traditional continuous casting process, a 6061 aluminum alloy was preliminarily forged to form a wheel-shaped casting blank, and then subsequently processed via rough-forging, fine-forging, and post-processing in sequence to obtain a finished product. The average material loss was about 68%, as shown in Table 9.

TABLE 9

| Blanking weight (kg) | Finished product weight (kg) | Material yield (%) |
|---|---|---|
| 36.6 | 12.82 | 35.03% |
| 41.2 | 13.46 | 32.67% |
| 42.0 | 12.72 | 30.29% |
| 36.0 | 13.16 | 36.56% |
| 41.2 | 14.35 | 34.83% |
| 32.37 | 9.9 | 30.58% |
| 37.4 | 11.3 | 30.21% |
| 34.4 | 10.55 | 30.67 |
| 34.8 | 11.3 | 32.47% |
| Average material yield | | 32.59% |

Based on the above, the disclosure discloses the advantages of centrifugal casting and forging, and provides an aluminum alloy wheel formed by a combination of casting and forging and a manufacturing method thereof, so as to provide an aluminum alloy wheel with an affordable price, excellent mechanical performance, and at the same time to solve the issue of low material yield in the existing forging process.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An aluminum alloy wheel for a vehicle, comprising:
a wheel central portion;
a rim portion surrounding the wheel central portion; and
a plurality of radial elements connected to the wheel central portion and the rim portion, wherein the wheel central portion comprises a first region, a second region, and a third region, the first region is located at a surface of the wheel central portion, the third region is located at a core of the wheel central portion, the second region is located between the first region and the third region, and
a grain size variation of the wheel central portion is a decreasing gradient in a lateral direction from the third region to the first region, wherein the grain size variation is a percentage value whose denominator is an average grain size of one of the first region, the second region, and the third region, and whose numerator is a deviation between the maximum grain size and the average grain size of the one of the first region, the second region, and the third region.

2. The aluminum alloy wheel for the vehicle of claim 1, wherein the aluminum alloy wheel for the vehicle is a 6XXX series aluminum alloy.

3. The aluminum alloy wheel for the vehicle of claim 1, wherein the grain size variation of the first region is 5% to 20%, the grain size variation of the second region is 25% to 45%, and the grain size variation of the third region is 46% to 60%.

* * * * *